United States Patent [19]

Kataoka et al.

[11] Patent Number: 5,289,573
[45] Date of Patent: Feb. 22, 1994

[54] MENU DISPLAYING APPARATUS FOR A WORD PROCESSOR

[75] Inventors: Misao Kataoka, Mie; Chiharu Hori; Yuri Usami, both of Nagoya; Manami Yamada, Seto; Kayoko Harada, Nagoya, all of Japan

[73] Assignee: Brother Kogyo Kabushiki Kaisha, Nagoya, Japan

[21] Appl. No.: 615,803

[22] Filed: Nov. 19, 1990

[30] Foreign Application Priority Data

Jan. 4, 1990 [JP] Japan ............................. 2-224

[51] Int. Cl.⁵ .............................................. G06F 3/153
[52] U.S. Cl. .................................... 395/156; 395/161
[58] Field of Search ............... 395/155, 156, 157, 158, 395/159, 160, 161; 340/706, 747, 750; 400/63, 83

[56] References Cited

U.S. PATENT DOCUMENTS

| | | | |
|---|---|---|---|
| 4,742,473 | 5/1988 | Shugar et al. | 364/518 |
| 4,815,029 | 3/1989 | Barka et al. | 364/900 |
| 5,119,475 | 6/1992 | Smith et al. | 395/156 |
| 5,120,944 | 6/1992 | Kern et al. | 235/379 |
| 5,122,972 | 6/1992 | Richards et al. | 395/157 |
| 5,159,669 | 10/1992 | Trigg et al. | 395/159 |
| 5,172,245 | 12/1992 | Kita et al. | 358/403 |

Primary Examiner—Phu K. Nguyen
Attorney, Agent, or Firm—Oliff & Berridge

[57] ABSTRACT

A menu displaying apparatus includes a display which has a menu display region for displaying a plurality of main items and at least one sub item, and a message display region for displaying various messages. Normally the sub massages are displayed within the menu display region, however, if the number of the sub items is larger than the available number of the lines of the menu display region, the apparatus enables the undisplayable sub item to be displayed in the message display region.

20 Claims, 7 Drawing Sheets

MENU DISPLAYING APPARATUS FOR A WORD PROCESSOR

BACKGROUND OF THE INVENTION

1. Field of the Invention

The present invention relates to a menu displaying apparatus for a word processor, and more particularly to a menu displaying apparatus wherein a sub menu is displayed in a menu display region set in a menu display as well as in a message display region in a state in which the sub menu is overrun. 2. Description of the Prior Art In general, for example, English language word processors are provided with displays having a plurality of display lines and with a number of functions intended to make it easier to perform a process for inputting document data and a process for editing the input document data.

Where it is desired to execute a desired function out of these many functions which have heretofore used, for example, a character decoration function such as an underline, a main menu comprising a plurality of main items with "character decoration" included therein is displayed on a display in response to operation of a menu key. When a desired main item "character decoration" is selected out of these main items displayed thereon, a plurality of sub items including "underline" and "boldface character" related to the selected main item "character decoration" are displayed on the display as a sub menu. Therefore, a desired sub item "underline" to be executed is selected out of these sub items.

Meanwhile, in a normal word processor equipped with a display having a small number of display lines, a main menu is displayed on the top line of the display, and one line or two lines from the bottom of the display are always maintained as a message display region for displaying the operation for selecting either the main item or sub item and for displaying guide messages relating to the execution of various functions. Thus, the respective sub items are displayed on the display at a time corresponding to the displayable number of lines one by one in a direction in which they approach from the second line on the display to the message display region. When an undisplayable sub item which cannot be displayed because of the presence of the message display region is selected, a cursor down-movement key is operated to scroll the sub items, thereby displaying the sub items in that region.

As described above, in the conventional word processor, problems arise in that the number of the sub items displayable at a time is reduced due to the fact that the message display region interferes with their displays. The scrolling operation for displaying the sub items undisplayable due to the interference by the presence of the message display region is thus cumbersome.

SUMMARY OF THE INVENTION

Accordingly, it is an object of the present invention to provide a menu displaying apparatus for a word processor, wherein a limited display region is effectively used so that the operation for selecting a desired one of several sub items is simplified.

A further object of the present invention is to provide a menu displaying apparatus for a word processor which enables simultaneous display of a larger number of menu sub items.

According to the present invention, there is provided a menu displaying apparatus for a word processor, comprising: a display having a menu display region for displaying at least one main item and at least one sub item associated with one said main item, and a message display region for displaying various messages; display control means for displaying said at least one main item in a first predetermined display portion of said menu display region and said at least one sub item in a second predetermined display portion of said menu display region; judging means for judging whether or not the at least one sub item associated with the at least one main item can be displayed in said menu display region; and instructing means for instructing the display control means to display a sub item which is undisplayable in said menu display region in said message display region when it is judged by said judging means that the at least one sub item cannot be fully displayed.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1:
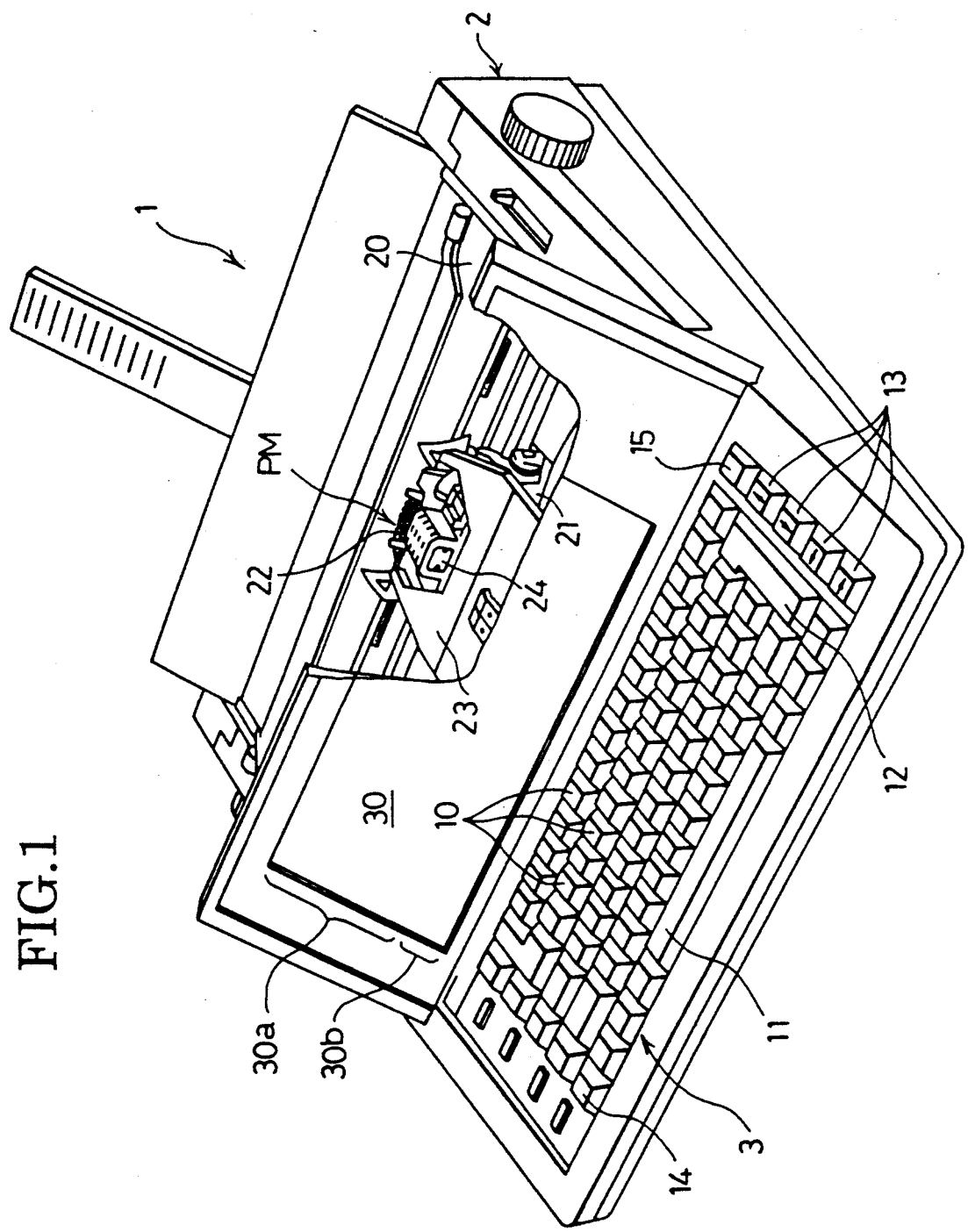
FIG. 1 is a perspective view of a word processor on which a menu displaying apparatus according to one embodiment of this invention is mounted.

Referring now to the drawings, and particularly to FIG. 1 thereof, a preferred embodiment of the present invention will be described below. The embodiment shows an English language word processor to which the present invention is applied.

As shown in FIG. 1, a word processor 1 has a keyboard 3 disposed in front of a main unit frame 2, and a font-wheel type printing mechanism PM disposed in the main unit frame 2 behind the keyboard 3. Behind the keyboard 3, a liquid crystal display 30 capable of displaying characters and symbols corresponding to 7 lines is pivotably disposed at a position shown in FIG. 1 where it is to be used and at an unillustrated position where it is to be contained. The display 30 has a display screen including a menu display region 30a for displaying a main menu and a sub menu and a guide message display region 30b for displaying various guide messages used to give an operator instructions about his operation procedure. The menu display region 30a has six displayable lines ranging from the top line to sixth line, whereas the guide message display region 30b has one displayable line occupying the bottom line.

Figure 9A:
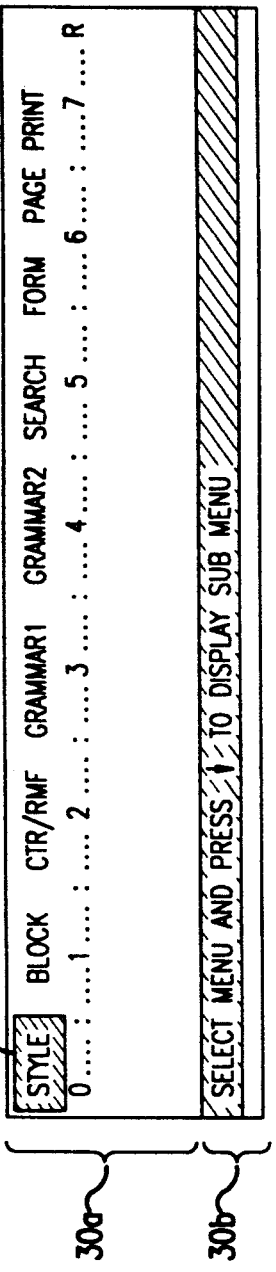
FIGS. 9(a) through 9(c) are diagrams illustrating steps for controlling the display of main menus, respectively.
Figure 9B:
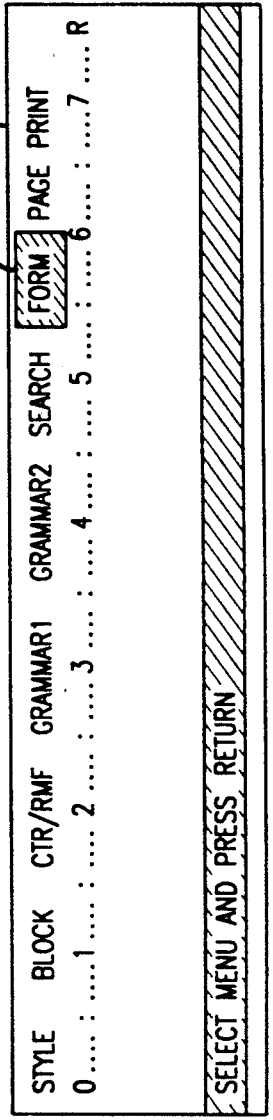
Figure 9C:
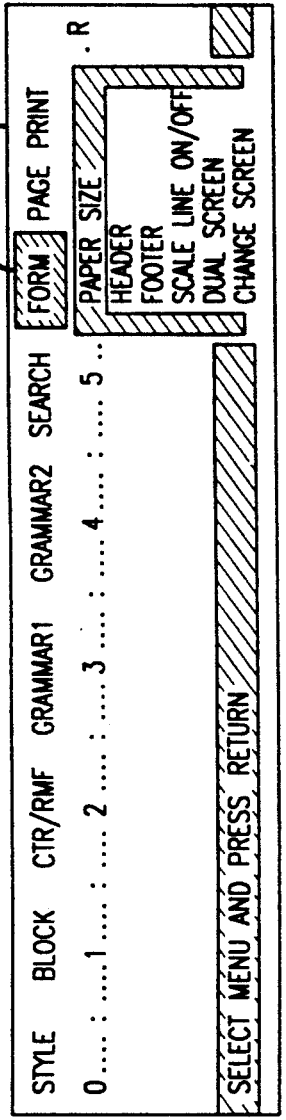

The keyboard 3 comprises character keys 10 including alphanumeric keys, ten keys and symbol keys, a space key 11, a return key 12, cursor movement keys 13 for moving a block cursor 60 (shown in FIGS. 9(a)-9(c)) vertically and horizontally, a menu key 14 for displaying a main menu, a cancel key 15 for canceling the execution of various functions, and various function keys.

The printing mechanism PM has a well-known construction. Namely, it comprises a platen 20 for feeding a printing sheet, a carriage 21 movable to the left and right directions along the platen 20, a petal-type daisy wheel 22 having a plurality of fonts formed on the distal ends of spokes protruding in the radial direction, a ribbon cassette 23 having a print ribbon contained therein and a hammer solenoid 24 for hitting the fonts.

Figure 2:
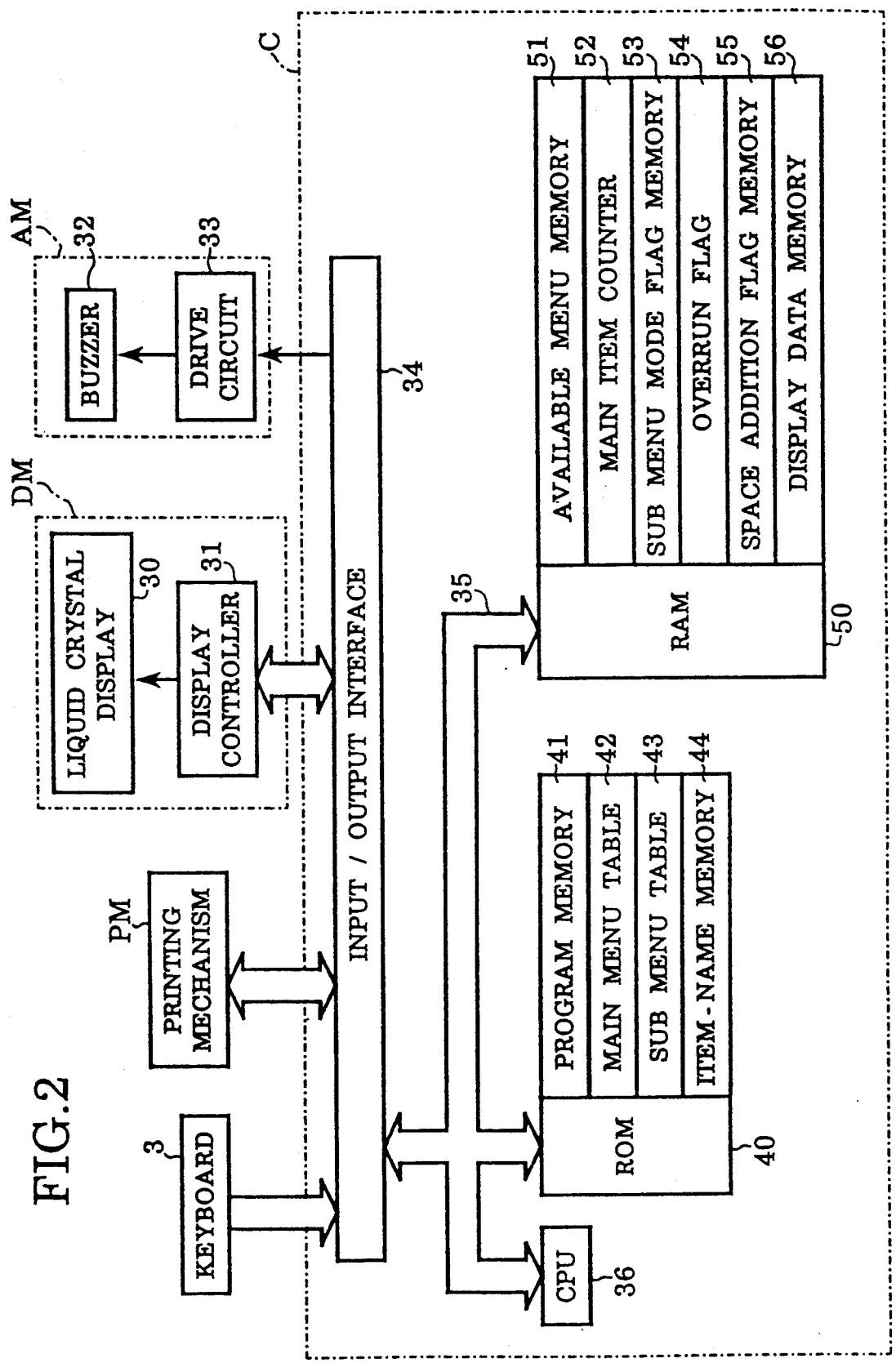
FIG. 2 is a block diagram of a control system of the word processor.

A description will now be made of the overall construction of a control system of the word processor 1 with reference to a block diagram shown in FIG. 2.

The word processor 1 basically comprises the keyboard 3, the printing mechanism PM, a display mechanism DM, an alarm mechanism AM, a controller C, etc. The keyboard 3, the printing mechanism PM, the display mechanism DM and the alarm mechanism AM are connected to an input/output interface 34 in the controller C.

The display mechanism DM has a well-known construction. It comprises the liquid crystal display 30, and a display controller 31 including a display RAM for outputting display data to the display 30 and a character generator ROM having a number of dot patterns such as characters and symbols contained therein. However, input document data is displayed in the menu display region 30a in an input mode or edit mode representative of t he document data.

The alarm mechanism AM comprises a buzzer 32 and a drive circuit 33 for energizing the buzzer 32 to produce a sound.

The controller C comprises a CPU 36, the input/output interface 34 connected to the CPU 36 via a bus 35 such as a data bus, a ROM 40 and RAM 50.

Figure 7:
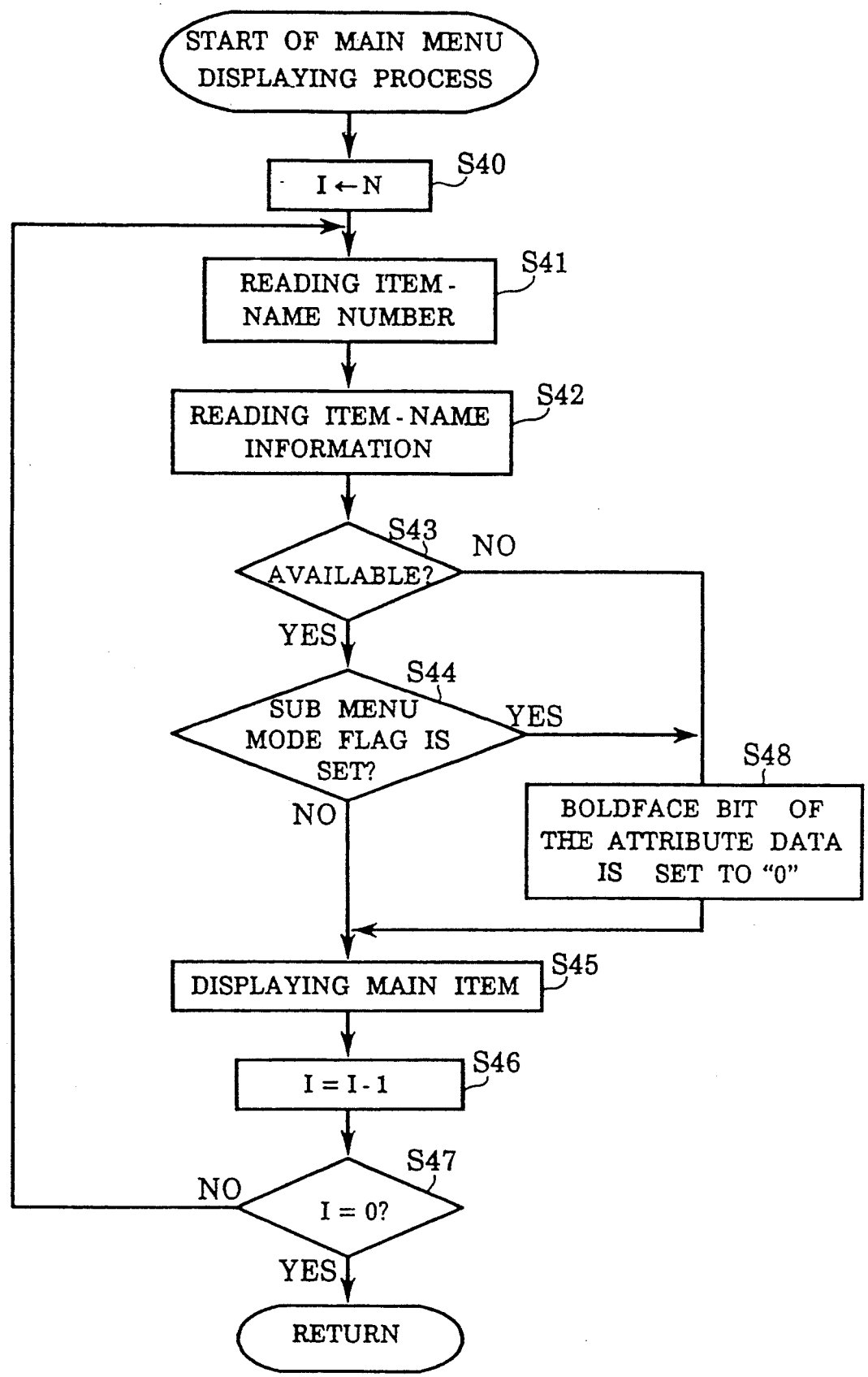
FIG. 7 is a flow chart of a subroutine for processing and controlling the display of a main menu.
Figure 8:
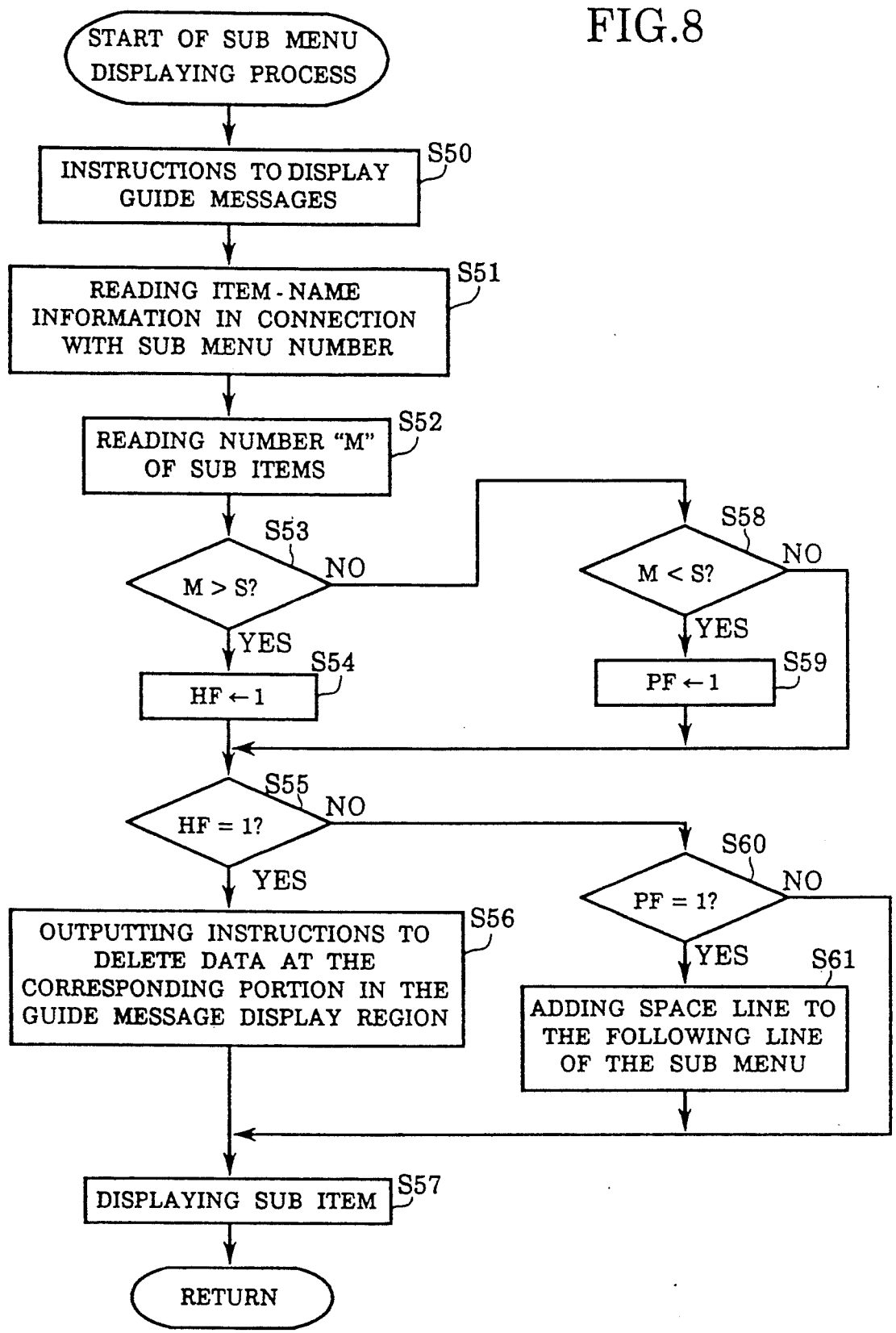
FIG. 8 is a flow chart of a subroutine for processing and controlling the display of a sub menu.

The ROM 40 has a program memory 41 which stores a control program for controlling the printing mechanism PM and the display mechanism DM according to code data input from the keyboard 3, a guide message control program for displaying various guide message in the guide message display region 30b and a menu display control program for displayably controlling the main menu and the sub menu. The menu display control program includes a subroutine for processing and controlling the display of the main menu (FIG. 7), and a subrouting for processing and controlling the display of the sub menu (FIG. 8).

Figure 3:
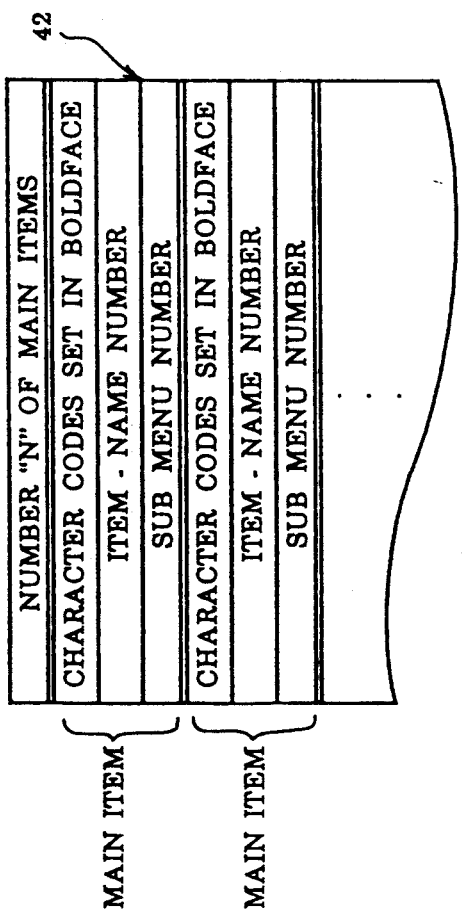
FIG. 3 is a diagram describing the structure of a main menu table.

As shown in FIG. 3, a main menu table 42 has the number "N" of main items, character codes set in boldface with respect to the respective main items, item-name numbers and sub menu numbers, all of which are contained therein.

Figure 4:
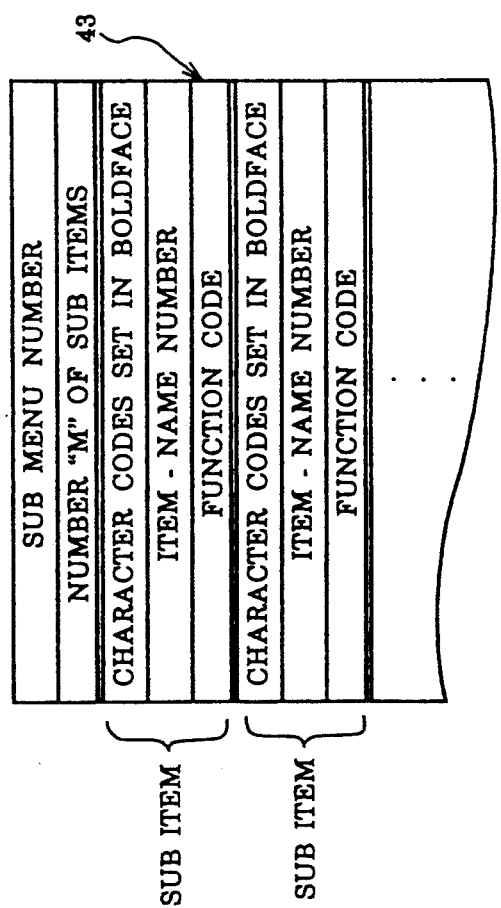
FIG. 4 is a diagram describing the structure of a sub menu table.

As shown in FIG. 4, a sub menu table 43 includes therein sub menu numbers and the number "M" of sub items applied to each of a plurality of main items, character codes set in boldface with respect to the individual sub items, item-name numbers and function codes indicative of the contents of functions of the sub items.

Figure 5:
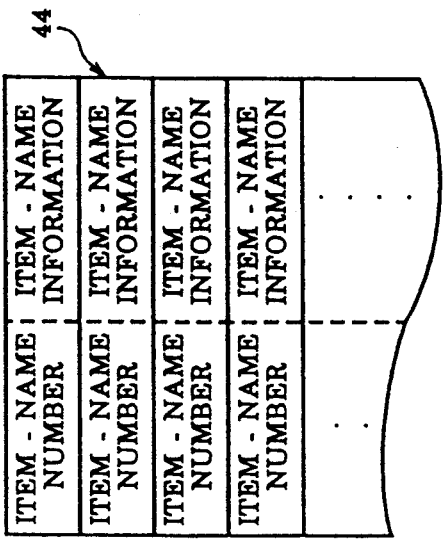
FIG. 5 is a diagram describing the structure of an item-name memory.

As depicted in FIG. 5, an item-name memory 44 stores therein a plurality of item-name numbers and a plurality of item-name information to be displayed on the display 30, while both are being associated with each other. The item-name information has code data in the form of a series of characters, which represent the main items and the sub items, and also has bold start codes and bold completion codes provided before and after the respective character codes set in boldface, respectively. When it is desired to subject a character "B" in a main item "BLOCK" to the boldface, for example, a series of item-name information representative of "a bolt start code, B, and a bold completion code LOCK" is stored.

The RAM 50 is provided with an effective menu memory 51 (1 byte) for storing therein "1" in respective usable main items and "0" in respective unusable main items in accordance with a state in which the menu key 14 is operated, a main item counter 52 (a value to be counted thereby is represented as I) for successively indicating main items, a sub menu mode flag memory 53 for storing therein a sub menu mode flag "SF", the sub menu mode flag "SF" being set when a sub menu mode representative of a sub menu is established, an overrun flag memory 54 for storing therein a sub item overrun flag "HF", the sub item overrun flag "HF" being set when a sub item is displayed in the guide message display region 30b in a state in which the sub item extends into a portion of the guide message display region 30b, a space addition flag memory 55 for storing therein a space addition flag "PF", the space addition flag "PF" being set when a space line is added to a next line of a displayed sub menu, a display data memory 56 for storing therein item-name data representative of the main items and the sub items displayed don the display 30, and various memories (not shown) for temporarily storing therein the results of computation of the CPU 36. Incidentally, in the display data memory 56, attribute data composed of 1 byte is added to the respective character code data of the main and sub items based on the item-name information. The respective character code data is represented in the form of 2 bytes. Thus, "1" is stored in the attribute data added to the character codes set in boldface, for each boldface bit thereof.

Figure 6:
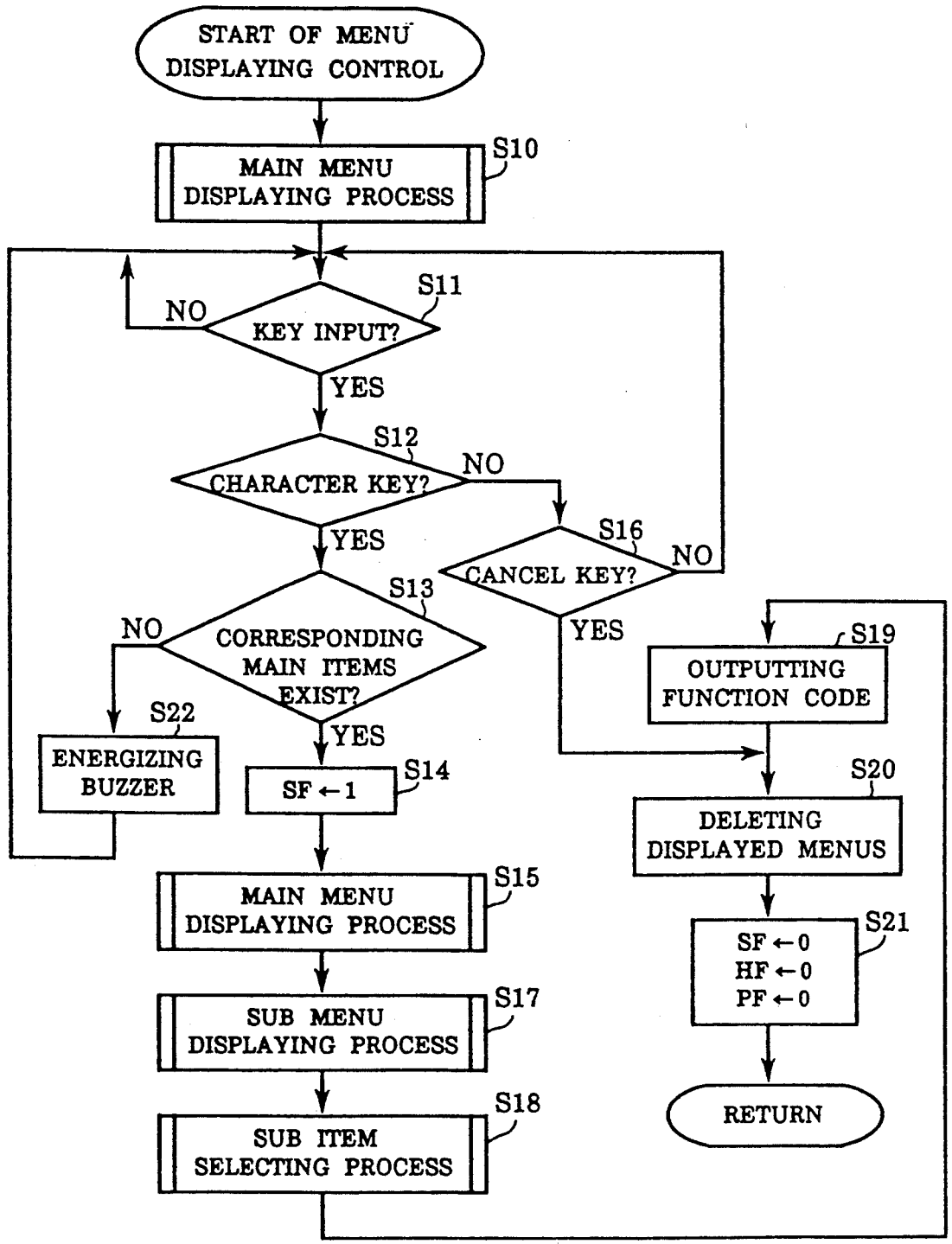
FIG. 6 is a schematic flow chart of a routine for controlling the display of a menu.

A description will now be made of a routine for controlling the display of a menu, which is effected by the controller C in the word processor 1 with reference to a flow chart shown in FIG. 6, in which Si (i= —1, 2, 3 . . . ) represents each of a plurality of steps.

When the menu key 14 is operated, it is determined by an unillustrated control program whether or not the respective main items are available (usable) according to a state in which the menu key 14 is operated. If they are available, data "1" is stored in the available menu memory 1. If not, data "0" is stored therein. Thereafter, this control starts as referred to above and the process displaying a main menu is first executed (in S10). When a start in the procedure for processing and controlling the display of the main menu is made (see FIG. 7), "N" is set to a value "I" counted by the main item counter 52 based on the number "N" of the main items in the main menu table 2 (in S40). The item-name numbers in the main items, which are indicated by the counted value "I" are read (in S41). The item-name information corresponding to the read item-name numbers is then read from the item-name memory 44. The respective character codes representative of the read item-name information are represented in the form of 2 bytes as mentioned above and then stored in the display data memory 56 (in S42). Then, data in the available menu memory 51 is retrieved. Thereafter, when a significant bit corresponding to the counted value "I" is "1", i.e., it is available (Yes in S43), and the sub menu mode flag "SF" has not been set (No in S44), the main items tagged with the boldfaced characters are displayed in a given position of the menu display region 30a in the display 30 (in S45). Next, if the counted value "I" is decreased by 1 (in S46) and the counted value "I" is not "0" (No in S47), then the procedures of S41 through S48 are repeated by the number of the main items. When the counted value "I" is brought to "0" (Yes in S47), the procedure for processing and controlling the display of the main menu is terminated. The routine procedure is then advanced to S11. If the main items are not available (No in S43), then a boldface bit of the attribute data is set to "0" (in S48). At this time, the main items are displayed without being tagged with boldfaced characters (in S45). As shown in FIG. 9(a), the procedures of S41 through S48 are repeated eight times, for example, and hence eight main items, i.e., "STYLE", "BLOCK" ... "PAGE PRINT" are displayed on the top or uppermost line of the menu display region 30a. The respective characters "S", "B", "C", "1", "2", "R", "F" and "P" in these main items are subjected to the boldface, since these eight items are all available in this embodiment, and then displayed on the uppermost line thereof.

Then, when the character key 10 corresponding to a boldfaced character of a desired main item is operated (Yes in S11 and S12), the main menu table 42 is retrieved. When the character code on the operated character key 10 exists as the boldfaced character code (Yes in S13), the sub menu mode flag SF is set (in S14) and the procedure for processing and controlling the display of the main menu is executed again (in S15). Since the sub menu mode flag SF has been set under this process/control, it is determined to be Yes in S44. Then, the routine procedure proceeds to S48 and S45, after which the main items are displayed in an unboldfaced state. When the letter "F" on the character keys 10 is depressed, for example, to select the main item "FORM", all the main items are displayed without being tagged with the boldfaced characters, as shown in FIG. 9(b). At this time, the block cursor 60 is moved onto the selected main item "FORM".

Then, the procedure for processing and controlling the display of the sub menu is executed (in S17). When this procedure (see FIG. 8) starts, the CPU 36 first gives the guide message control program instructions to display guide messages in the guide message display region 30b (in S50). The item-name information about all the sub items, which is stored in connection with the sub menu numbers of the selected main items, is read from the item-name memory 44. Then, each of the character codes of the read item-name information is represented in the form of 2 bytes and stored in the display data memory 56 (in S51). Then, when the number "M" of the sub items in the sub menu is read (in S52), and the number "M" of the sub items is greater than the preset number "S" of lines capable of displaying the sub menu in the menu display region 30a (Yes in S53), the sub item overrun flag "HF" is set (in S54). When the sub item overrun flag "HF" has been set (Yes in S55), the CPU 36 gives the guide message control program instructions to delete data at the corresponding portion in the guide message display region 30b (in S56). The sub items tagged with the boldfaced characters are displayed in the menu display region 30a and a region where the guide message display region 30b is partly deleted, the sub items extending into a portion of the guide message display region 30b, while being fed in a line-by-line manner (in S57). When the main item "FORM" is selected, for example, as shown in FIG. 9(c), and at the same time, six sub items related to the main item "FORM" are present, the data at the corresponding portion in the guide message display region 30b is deleted. Then, five sub items are displayed in the menu display region 30a, and the sixth sub item is displayed in the deleted portion of the guide message display region 30b by extending into a portion of the guide message display region 30b. Thus, the six sub items tagged with the boldfaced characters are respectively displayed thereon. Incidentally, as shown in FIG. 9(c), the sub items are displayed below the selected main item.

On the other hand, when the number "M" of the sub items is smaller than the number "S" of the lines capable of displaying the sub menu (No in S53, and Yes in S58), the space addition flag "PF" is set (in S59). In this case, as the sub item overrun flag "HF" has not been set (No in S55), and the space addition flag "PF" has been set (Yes in S60), space-line data corresponding to the sub menu is added to the following line of the sub menu (in S61). Then, the sub menu and the space line are displayed in the menu display region 30a (in S57). More specifically, where the sub menu is displayed when the input document data is displayed in the menu display region 30a, the discrimination between the document data and the sub menu is made clear by adding the space line, i.e., the blank to the following line of the sub menu. When the read number "M" of the sub items is equal to the number "S" of the lines capable of displaying the sub menu (No in S53 and S58), the sub item overrun flag "HF" has not been set (no in S55) and the space addition flag "PF" has not been set (No in S60), the read sub menu is displayed as it is (in S57).

After the procedure for processing and controlling the display of the sub menu has been completed, the character key 10 representative of a character identical to the boldfaced character is pressed to select a desired sub item (in S18). Then, the function code for the sub item selected based on the sub menu table 43 is output (in S19) and the displayed menus are all deleted (in S20). Thereafter, the sub menu mode flag "SF", the sub item overrun flag "HF", and the space addition flag "PF" are reset, respectively (in S21). This process/control is hence completed and the procedure is returned to the main routine.

When the intended main item does not exist in the character codes indicated by the operated character keys 10 while the main menu is being displayed (Yes in S12 and No in S13), the buzzer 32 is energized to produce a sound (in S22). When the cancel key 15 is operated (Yes in S11, No in S12 and Yes in S16), the procedure beginning at S20 is executed to complete this process/control.

As an alternative to the case where the character keys 10 are operated to select a desired main item, the procedure subsequent to S17 may be executed such that when the cursor movement key 13 is operated, the block cursor 60 is moved onto each of the main items in the right and left directions, and the block cursor 60 indicates each of the main items when the return key 12 and the cursor movement key 13 are operated.

The guide message region 30b may be also partly deleted by eliminating S56 which executes the procedure for processing and controlling the display of the sub menu and by writing sub menu data into the display RAM in the display controller 31 upon displaying the sub menu in S57.

As has been described above, when all the sub items related to the selected main item cannot be displayed in the menu display region 30a at a time, an undisplayable sub item is displayed in the corresponding portion of the guide message display region 30b at a portion of the guide message display region 30b, the sub item extending into a portion of the guide message display region 30b. Therefore, the number of the sub items displayable at a time can be increased. The cumbersome scroll operation normally effected when a desired sub item is selected can be omitted, thereby considerably simplifying the sub item selecting operation. The present invention can be applied to various document processing apparatus such as electronic typewriters of the type wherein a menu display can be performed, etc.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A menu displaying apparatus for a word processor, comprising:
    a display having a menu displaying region for displaying at least one main menu item and at least one sub menu item associated with one of said at lest one main menu item, and a message display region for displaying various messages;
    display control means for displaying said at least one main menu item in a first predetermined display portion of said menu display region and said at least one sub menu item in a second predetermined display portion of said menu display region;
    judging means for judging whether the at least one sub menu item associated with the at least one main menu item can be displayed in said menu display region; and
    instructing means for instructing the display control means to display a sub menu item in said message display region when said judging means judges that the at least one sub menu item cannot be fully displayed in the second predetermined display portion.

2. The menu displaying apparatus of claim 1, wherein said display control means includes a main menu display control means for displaying said at least one main menu item.

3. The menu displaying apparatus of claim 2, wherein said display control means includes a sub menu display control means for displaying said at least one sub menu item.

4. The menu displaying apparatus of claim 1, wherein a plurality of main menu items are displayed in said menu display region, said apparatus further comprising main menu item selecting means for alternatively selecting a desired main menu item out of said plurality of main menu items displayed on said display.

5. The menu displaying apparatus of claim 4, wherein one character of each at least one displayed main menu item is specified, and wherein said desired main menu item is selected by said main menu item selecting means by designating said specified character.

6. The menu displaying apparatus of claim 1, wherein a plurality of sub menu items are associated with one of the at least one main menu item and wherein one character of each of the plurality of displayed sub menu items is specified, a desired sub menu item being selected by designating said specified character.

7. The menu displaying apparatus of claim 1, wherein said instructing means instructs said display control means to display a space following said at least one sub menu item when said judging means judges that a number of said at least one sub menu item is smaller than a number of available areas in said menu display region.

8. The menu displaying apparatus of claim 1, wherein said at lest one sub menu item is displayed below said at least one main menu item.

9. The menu displaying apparatus of claim 1, wherein said judging means executes said judgment by comparing a number of the at least one sub menu item associated with the at least one main menu item and a number of available areas in said menu display region.

10. The menu displaying apparatus of claim 1, wherein each said at least one sub menu item is displayed in said menu display region in a line-by-line manner and said judging means executes said judgment by comparing a number of said at least one sub menu item and a number of available lines in said menu display region.

11. The menu displaying apparatus of claim 10, wherein said instructing means instructs said display control mean to display a space following said at least one sub menu item when said judging means judges that the number of said at least one sub menu item associated with said main menu item is smaller than the number of lines in said menu display region.

12. A menu displaying apparatus for a word processor, comprising:
    a display having a menu display region for displaying a plurality of main menu items and at least one sub menu item associated with each of said main menu items, and a passage display region for displaying various messages;
    main menu display control means for displaying each of said plurality of main menu items in a first predetermined display portion of said menu display region;
    main menu item selecting means for alternatively selecting a desired main menu item out of said plurality of main menu items displayed on said display;
    sub menu display control means for displaying, in a second predetermined display portion of said menu display region, the at least one sub menu item associated with the main menu item selected by said main menu item selecting means;
    judging means for judging whether the at least one sub menu item associated with the selected main menu item can be fully displayed in said menu display region; and
    instructing means for instructing said sub menu display control means to display a sub menu item in said message display region when said judging means judges that the at least one sub menu item is unable to be fully displayed in the second predetermined display portion.

13. The menu displaying apparatus one character of each of said plurality of main menu items is specified, and wherein said desired main menu item is selected by said main menu item selecting means by designating said specified character.

14. The menu displaying apparatus of claim 12, wherein said instructing means instructs said sub menu display control means to display a space following said at least one sub menu item when said judging means judges that a number of said at least one sub menu item is smaller than a number of available areas in said menu display region.

15. The menu displaying apparatus of claim 12, wherein said at least one sub menu item is displayed below said selected main menu item.

16. The menu displaying apparatus of claim 12, further comprising main menu item storing means for storing therein said plurality of main menu items.

17. The menu displaying apparatus of claim 16, further comprising sub menu item storing means for storing therein said at least one sub menu item associated with each of said plurality of main menu items.

18. The menu displaying apparatus of claim 12, wherein said judging means executes said judgment by comparing a number of the at least one sub menu item associated with the selected main menu item and a number of available areas in said menu display region.

19. The menu displaying apparatus of claim 12, wherein each said at least one sub menu item is displayed in said menu display region in a line-by-line manner, and said judging means executes said judgment by comparing a number of said at least one sub menu item and a number of available lines in said menu display region.

20. The menu displaying apparatus of claim 19, wherein said instructing means instructs said sub menu display control means to display a space following said at least one sub menu item when said judging means judges that the number of said at least one sub menu item associated with the selected main menu item is smaller than the number of lines in said menu display region.

* * * * *